United States Patent
Philbrick et al.

(10) Patent No.: US 12,027,983 B2
(45) Date of Patent: *Jul. 2, 2024

(54) MULTI-PHASE SWITCHING REGULATOR INCORPORATING PHASE CURRENT BALANCE CIRCUIT

(71) Applicant: Alpha and Omega Semiconductor International LP, Sunnyvale, CA (US)

(72) Inventors: Rhys S. A. Philbrick, Los Gatos, CA (US); Steven P. Laur, Raleigh, NC (US); Nicholas I. Archibald, San Francisco, CA (US)

(73) Assignee: Alpha and Omega Semiconductor International LP, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,059

(22) Filed: May 13, 2023

(65) Prior Publication Data

US 2023/0283186 A1 Sep. 7, 2023

Related U.S. Application Data

(63) Continuation of application No. 17/481,310, filed on Sep. 22, 2021, now Pat. No. 11,682,974.

(51) Int. Cl.
*H02M 3/158* (2006.01)
*H02M 1/00* (2006.01)

(52) U.S. Cl.
CPC ....... *H02M 3/1584* (2013.01); *H02M 1/0025* (2021.05)

(58) Field of Classification Search
CPC .................. H02M 3/1584; H02M 1/0025
See application file for complete search history.

(56) References Cited

U.S. PATENT DOCUMENTS

| | | | |
|---|---|---|---|
| 4,837,495 | A | 6/1989 | Zansky |
| 4,975,820 | A | 12/1990 | Szepesi |
| 6,278,263 | B1 | 8/2001 | Walters |
| 6,369,665 | B1 | 4/2002 | Chee et al. |
| 6,670,794 | B1 | 12/2003 | Wang |
| 7,378,822 | B2 | 5/2008 | Liao |

(Continued)

OTHER PUBLICATIONS

Compensation Design for Peak current-Mode buck Converters, Richtek, Richtek Technology Corporation, Hsinchu, Taiwan, ANO28—Apr. 2014, pp. 1-13.

(Continued)

*Primary Examiner* — Alex Torres-Rivera

(57) ABSTRACT

A multi-phase current mode hysteretic modulator implements phase current balancing among the multiple power stages using slope-compensated emulated phase current signals and individual phase control signal for each phase. In some embodiments, the slope-compensated emulated phase current signals of all the phases are averaged and compared to the slope-compensated emulated phase current signal of each phase to generate a phase current balance control signal for each phase. The phase current balance control signal is combined with the voltage control loop error signal to generate a phase control signal for each phase where the phase control signals are generated for the multiple phases to control the phase current delivered by each power stage.

20 Claims, 9 Drawing Sheets

(56) References Cited

U.S. PATENT DOCUMENTS

| | | | |
|---|---|---|---|
| 8,278,830 | B2 | 10/2012 | Archibald |
| 8,405,368 | B2 | 3/2013 | Laur et al. |
| 8,629,662 | B2 | 1/2014 | Lau et al. |
| 9,236,800 | B2 | 1/2016 | Tang et al. |
| 9,244,473 | B2 | 1/2016 | Young et al. |
| 9,369,043 | B2 | 6/2016 | Couleur |
| 9,438,117 | B2 | 9/2016 | Sreenivas |
| 9,467,051 | B2 | 10/2016 | Stoichita et al. |
| 9,490,702 | B1 | 11/2016 | Zhak et al. |
| 9,600,063 | B2 | 3/2017 | Laur |
| 10,641,799 | B2 | 5/2020 | Schrom et al. |
| 10,833,661 | B1 | 11/2020 | Archibald et al. |
| 2003/0201761 | A1 | 10/2003 | Harris |
| 2003/0218893 | A1 | 11/2003 | Tai |
| 2006/0043943 | A1* | 3/2006 | Huang ............... H02M 3/158 323/222 |
| 2010/0033154 | A1 | 2/2010 | Cheng |
| 2010/0141225 | A1 | 6/2010 | Isham |
| 2013/0293203 | A1 | 11/2013 | Chen |
| 2013/0307503 | A1* | 11/2013 | Ouyang ............... G05F 1/10 323/282 |
| 2020/0091819 | A1* | 3/2020 | Kobayashi ............ H02M 1/088 |

OTHER PUBLICATIONS

Keeping, Steven, The Role of Slope Compensation in current-Mode-Controlled Voltage Regulators, Contributed by Electronic Products, Thief River Falls, MN, Jan. 20, 2015, 6 pgs.

Munoz, Juan-Guillermo G, et al. "Slope Compensation Design for a Peak Current-Mode Controlled Boost-Flyback Converter." Energies, vol. 11, No. 11, 2018, pp. Energies, Nov. 1, 2018, vol. 11(11).

Ridley, R.B. "A New, Continuous-Time Model for Current-Mode Control (Power Convertors)." IEEE Transactions on Power Electronics, vol. 6, No. 2, 1991, pp. 271-280.

Sheehan, Robert, "Emulated Current Mode Control for buck regulators Using Sample and Hold Technique: Small Signal Linear Analysis And Comparison to Peak and Valley Methods," Texas Instruments, LM3495, No. SNVA537, Power Electronics Technology Exhibition and Conference, Oct. 24, 2006, Long Beach, CA. 51 pgs.

Sheehan, Robert. "Part One: A New Way to Model Current-Mode Control." Power Electronics Technology, vol. 33, No. 5, May 2007, pp. 14-20.

Sheehan, Robert. "Part Two: A New Way to Model Current-Mode Control." Power Electronics Technology, vol. 33, No. 6, Jun. 2007, pp. 22-32.

Sheehan, Robert. "Understanding and Applying Current-Mode Control Theory: Practical Design Guide for Fixed-Frequency, Continous Conduction-Mode Operation." Texas Instruments, No. SNVA555, Pwers Electronics Technology Exhibition and Conference, Oct. 31, 2007, Dallas, TX, 30 pgs.

* cited by examiner

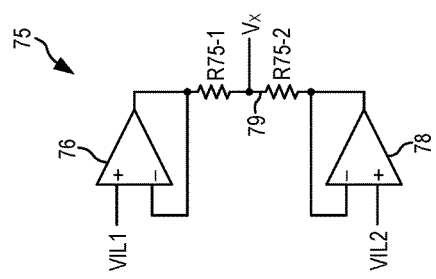
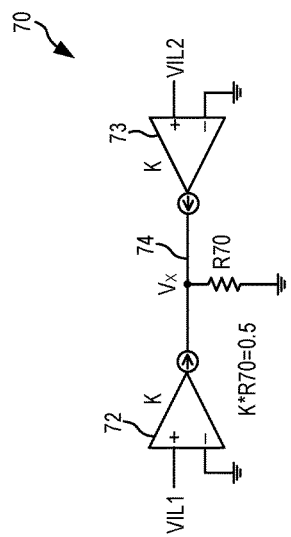
Fig. 6(a)
Fig. 6(b)
Fig. 6

MULTI-PHASE SWITCHING REGULATOR INCORPORATING PHASE CURRENT BALANCE CIRCUIT

CROSS REFERENCE TO RELATED APPLICATIONS

This application is a continuation of U.S. patent application Ser. No. 17/481,310, entitled MULTI-PHASE SWITCHING REGULATOR WITH VARIABLE GAIN PHASE CURRENT BALANCING USING SLOPE-COMPENSATED EMULATED PHASE CURRENT SIGNALS, filed Sep. 22, 2021, now U.S. Pat. No. 11,682,974, issued Jun. 20, 2023, which is incorporated herein by reference in its entirety.

FIELD OF THE INVENTION

The invention relates to multi-phase current mode hysteretic modulators and, in particular, to circuit and methods for providing phase current balancing in a multi-phase current mode hysteretic modulator.

BACKGROUND OF THE INVENTION

Electronic systems incorporating integrated circuits typically employ voltage regulators to convert a main bus voltage from a power source supplying the system to one or more voltages necessary for driving the integrated circuits therein. For example, a 5 volts supply voltage provided to an electronic system may need to be reduced to 1.8 volts to drive an integrated circuit in the electronic system. Embedded systems, such as Internet of Things (IoT) devices, include processors (or microcontrollers) and local memory coupled to components and executing embedded software to perform certain tasks. In practice, the processor power supply is provided by a voltage regulator converting an input voltage from a power source to a voltage value specified for the processor. In some cases, the microcontrollers or processors used in these embedded systems implement mobile voltage positioning to allow the processor to control or select its own operating voltage (Vcc). The processor generates a multi-bit voltage identification code to inform the voltage regulator what the regulator output voltage should be at any instant. In this manner, the processor may dynamically adjust the processor supply voltage (Vcc) based on processor activity to reduce processor power consumption. For example, the processor may adjust the processor supply voltage to maintain a higher processor clock speed at a given power consumption, or the processor may adjust the processor supply voltage to lower power consumption at a given clock frequency.

Switch mode power supplies or switching regulators, also referred to as DC-to-DC converters, are a type of voltage regulators often used to convert an input supply voltage to a desired output voltage at a voltage level selected for an integrated circuit. In one example, a 12V or 5V supply voltage may be reduced to 1V for supplying an embedded processor. A switching regulator provides power supply function through low loss components such as capacitors, inductors, and transformers, and power switches that are turned on and off to transfer energy from the input to the output, sometimes in discrete packets. A feedback control circuit is used to regulate the energy transfer to maintain a constant output voltage within the desired load limits of the circuit.

The operation of the conventional switching regulator is well known and can be generalized as follows. For a step down (or buck) switching regulator, the switching regulator includes a pair of power switches which are turned on and off to regulate an output voltage to be equal to a reference voltage where the output voltage is less than the input voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load.

A wide variety of control methods can be applied to switching regulators. One type of switching regulator control scheme is current mode control where the switching regulator modulates the peak current or the valley current in the output inductor in order to deliver the required energy to the load to maintain the desired output voltage. In current mode control, the inductor or power switch current is sensed, and the sensed current is compared to a current loop error signal to control the turning on or off of the high-side power switch. In some cases, slope compensation is applied in the current control loop to enhance the stability of operation.

Some switching regulators employ pulse width modulation (PWM) to control the duty cycle of the power switches. That is, the on-time of power switches may be controlled at a given fixed or variable frequency by adjusting the pulse width. Switching regulators employing PWM control include a PWM controller or modulator to drive a power block including the power switches, the driver circuit for the power switches and the LC filter circuit.

In some cases, the switching regulator is a single-phase converter and the PWM controller generates a single-phase PWM clock signal to drive a single-phase power block. In other cases, the switching regulator is a multi-phase converter and a multi-phase PWM controller generates clock signals with different phase shifts to drive a multi-phase power block, each clock signal driving a respective power block cell. Multi-phase PWM controllers are desirable when the voltage regulator has to deliver a regulated output voltage with high precision over a wide range of load conditions.

BRIEF DESCRIPTION OF THE DRAWINGS

Various embodiments of the invention are disclosed in the following detailed description and the accompanying drawings.

FIG. 6, which includes FIGS. 6(a) and 6(b), illustrates exemplary signal average circuits which can be incorporated in the phase current balance circuit in embodiments of the present disclosure.

DETAILED DESCRIPTION OF THE INVENTION

According to embodiments of the present invention, a multi-phase current mode hysteretic modulator implements phase current balancing among the multiple power stages using slope-compensated emulated phase current signals and individual phase control signal for each phase. In some embodiments, the slope-compensated emulated phase current signals of all the phases are averaged and compared to the slope-compensated emulated phase current signal of each phase to generate a phase current balance control signal for each phase. The phase current balance control signal is combined with the voltage control loop error signal to generate a phase control signal for each phase where the phase control signals are generated for the multiple phases to control the phase current delivered by each power stage.

As thus configured, the multi-phase current mode hysteretic modulator of the present disclosure provides a fast phase current balance control loop to maintain proper current balance among the phases and to keep the different phases of the power stages operating in sync with each other during fast transient event at the load.

In some embodiments, the multi-phase current mode hysteretic modulator, also referred herein as a multi-phase current mode control modulator, is applied in a switching regulator or voltage regulator to generate a regulated output voltage from an input voltage. The current mode control modulator generates a set of pulse-width modulation signals, each having a given duty cycle and in separate phases. The current mode control modulator can be applied in a buck switching regulator, a boost switching regulator, or a buck-boost switching regulator. Furthermore, in embodiments of the present disclosure, the multi-phase current mode control modulator can be applied in a modulator implementing peak current mode control or valley current mode control.

In embodiments of the present disclosure, the multi-phase current mode control modulator implements a phase current balance control loop using emulated or synthesized phase current signals. The phase current balance control loop generates individual phase control signal for each phase of the voltage regulator. In some embodiments, the emulated or synthesized phase current signals are generated using ramp signal generators that incorporate slope compensation into each emulated phase current signal. In one example, the current mode hysteretic modulator implements peak current control and the phase current signal is used by the current mode hysteretic modulator to terminate the on-duration of the PWM signal of the modulator. In other control topology, the phase current signal may be used to start the on-duration of the PWM signal.

Figure 1:
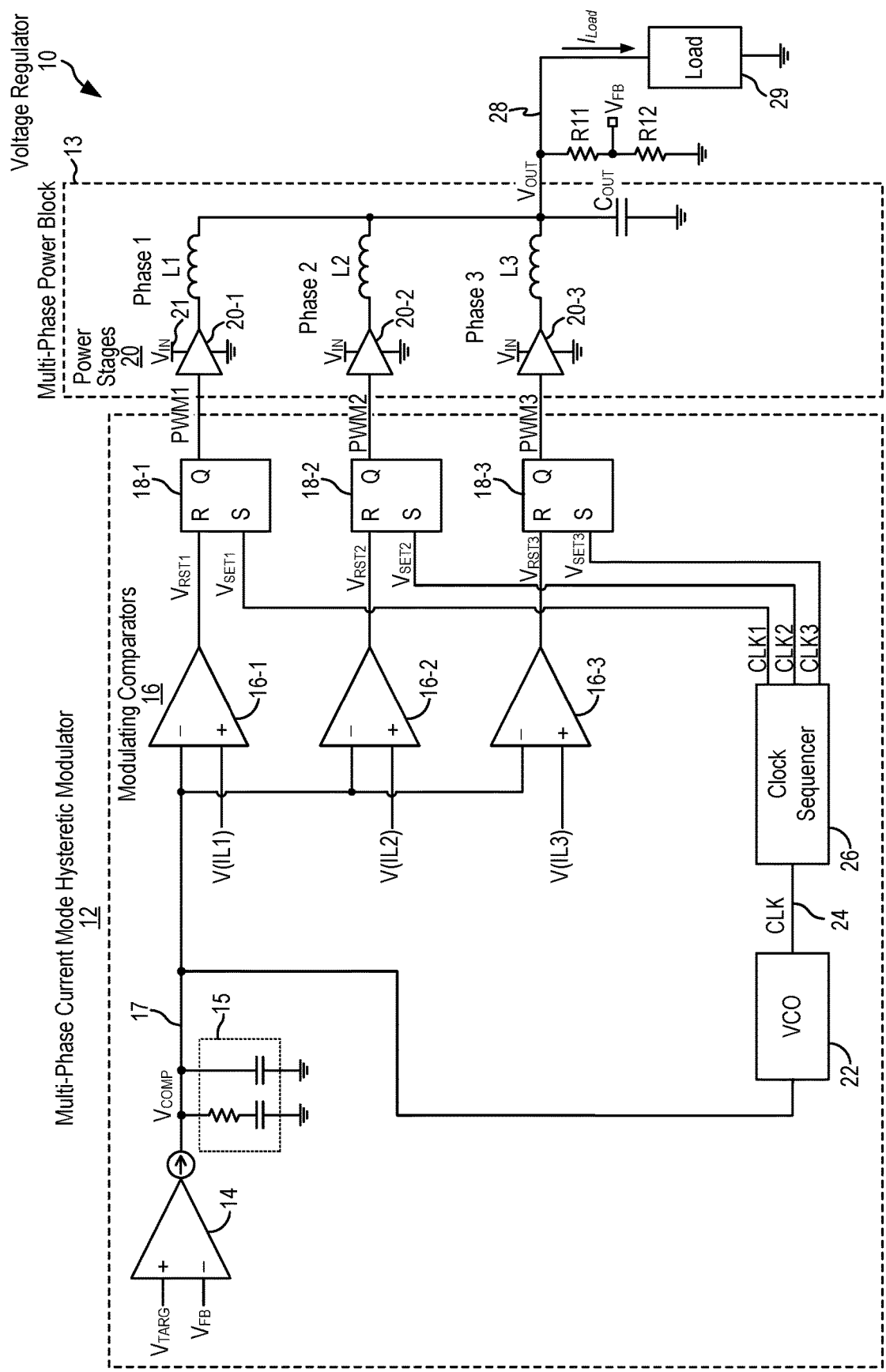
FIG. 1 is a schematic diagram of a voltage regulator incorporating a multi-phase current mode hysteretic modulator in some examples.

FIG. 1 is a schematic diagram of a voltage regulator incorporating a multi-phase current mode hysteretic modulator in some examples. Referring to FIG. 1, a voltage regulator 10 includes a multi-phase current mode hysteretic modulator 12 ("modulator 12") coupled to drive a multi-phase power block 13. In the present example, the voltage regulator 10 is implemented using a multi-phase modulator to enable the voltage regulator to deliver a regulated output voltage with high precision over a wide range of load conditions. In the present example, the multi-phase modulator 12 includes three phases and the power block 13 includes three power stages 20-1 to 20-3 with respective associated output inductors L1 to L3 and an output capacitor $C_{OUT}$.

More specifically, the voltage regulator 10 receives an input voltage $V_{IN}$ on an input node 21 and generates a regulated output voltage $V_{OUT}$ on an output node 28 to supply a load 29. The multi-phase power block 13 includes power stages 20-1 to 20-3 driven by respective PWM signals PWM1 to PWM3. Each power stage 20 includes a pair of serially connected power switches which are turned on and off by the respective PWM signal to regulate the output voltage $V_{OUT}$ with reference to a target voltage. The power switches in each power stage 20 are alternately turned on and off to generate a switching output voltage at a switching output node, which is the output terminal of each power stage. The switching output node for each power stage 20 is coupled to respective output inductor L1 to L3. The inductors L1 to L3 are coupled to the output capacitor $C_{OUT}$ to form an LC circuit for providing current to the output node 28 while maintaining a substantially constant output voltage $V_{OUT}$. The output voltage $V_{OUT}$ can then be used to drive the load 29.

The current mode hysteretic modulator 12 receives a feedback voltage $V_{FB}$ indicative of the regulated output voltage $V_{OUT}$ on output ode 28. In one example, the feedback voltage $V_{FB}$ is a stepped down voltage of the output voltage $V_{OUT}$. For example, the feedback voltage $V_{FB}$ can be generated using a resistor divider including resistors R11 and R12 coupled to the output voltage node 28. The current mode hysteretic modulator 12 also receives a target voltage $V_{TARG}$ indicative of the voltage value desired for the regulated output voltage. In some examples, the target voltage may be indicated by a voltage identification code signaling the desired regulator output voltage. For instance, when applied in mobile voltage positioning, the modulator 12 may receive a voltage identification (VID) code that tells the modulator what output voltage it should provide. Each VID code is associated with a voltage value. A decoder decodes the code to generate the target voltage.

The modulator 12 implements a voltage regulation loop or a voltage control loop where the feedback voltage $V_{FB}$ is compared to the target voltage $V_{TARG}$ at an error amplifier 14 to generate a voltage control loop error signal $V_{COMP}$. The error signal $V_{COMP}$ can be a voltage signal or a current signal. In the present example, the error amplifier 14 generates an output current which is converted to a voltage signal by a loop filter 15. The error signal $V_{COMP}$ is therefore a voltage signal in the present example. The error signal $V_{COMP}$ is provided to the inverting input terminals of a set of modulating comparators 16-1 to 16-3, each modulating comparator corresponding to one phase of the multi-phase voltage regulator. In the present example, each modulating comparator 16 receives a sensed current signal ILn from the respective power stage 20 at the non-inverting input terminal. In particular, the voltage signal V(ILn) is indicative of the inductor current ILn at the respective power stage 20-n. For example, the first modulating comparator 16-1 receives a voltage signal V(IL1) at the non-inverting input terminal where the voltage signal V(IL1) is indicative of the current flowing through output inductor L1. In some traditional voltage regulators, the voltage signal V(IL1) is generated by sensing the inductor current at the output inductor of each phase.

Each of the modulator comparators 16-1 to 16-3 generates a reset voltage signal VRST which is coupled to the Reset input terminal of the respective latch circuit 18-1 to 18-3. In the present embodiment, the latch circuits 18-1 to 18-3 are flip-flops. Each of the Set input terminals of the latch circuit 18-1 to 18-3 receives a set voltage signal $V_{SET}$ being a respective clock signal CLK1-CLK3 having the respective phase. The latch circuits 18-1 to 18-3 generate the multi-phase PWM signals PWM1 to PWM3 to drive the respective power stages 20-1 to 20-3 in the multi-phase power block 13. Each of power stages 20-1 to 20-3 are driven in separate phases.

In one example, a voltage-controlled oscillator (VCO) 22 receives the voltage control loop error signal $V_{COMP}$ and generates a clock signal CLK (node 24) in response to changes in the error signal. In the multi-phase modulator 12, the clock signal CLK is provided to a clock sequencer 26 to separate into multiple clock signals CLK1 to CLK3 having different phases. In some examples, the VCO 22 operates to provide variable switching frequency control in modulator 12 to enable the voltage regulator to be more responsive to load changes.

Figure 2:
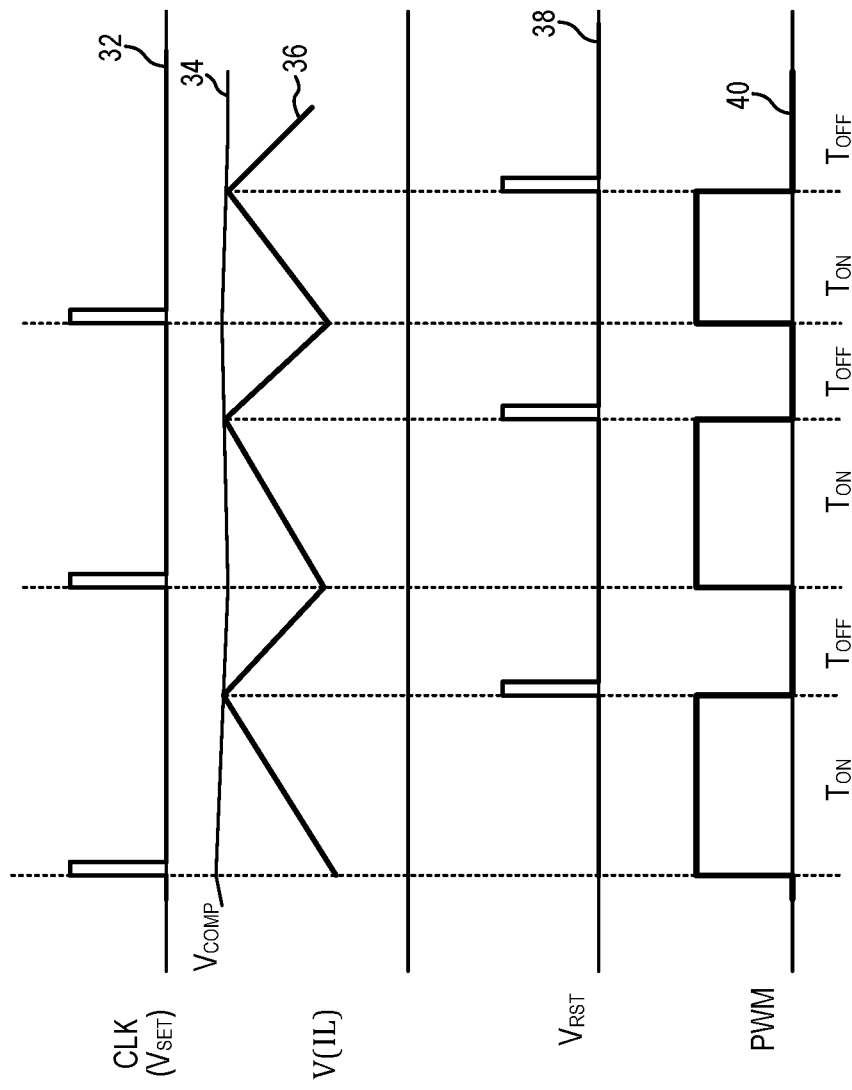
FIG. 2 illustrates the operating signals in a current mode hysteretic modulator in some examples.

As thus constructed, the current mode hysteretic modulator 12 implements a voltage control loop through the feedback voltage $V_{FB}$ and a current control loop through the sensed current signal ILn. The operation of the modulator 12 to generate the PWM signals PWM1-3 is described with reference to FIG. 2. FIG. 2 illustrates the operating signals in a current mode hysteretic modulator for a single-phase clock signal in some examples. In particular, FIG. 2 illustrates the operation of the current mode hysteretic modulator implementing peak current control. Referring to FIG. 2, the clock signal CLK (curve 32) is generated in response to the error signal $V_{COMP}$ (curve 34) to determine the frequency of the PWM signal. That is, the clock signal CLK is triggered or asserted at a frequency determined as a function of the error signal $V_{COMP}$. When the clock signal CLK is asserted, the PWM signal starts a new duty cycle. That is, the clock signal CLK, being the set voltage signal $V_{SET}$, triggers the on-duration of the PWM signal. The sensed current IL is measured and compared against the error signal $V_{COMP}$. For instance, a voltage signal V(IL) (curve 36) indicative of the sensed current IL is used to compare to the error voltage signal $V_{COMP}$. When the sensed current IL (or the voltage V(IL) indicative thereof) reaches the error signal $V_{COMP}$, the reset voltage signal VRST is triggered which terminates the on-duration of the PWM signal. In this manner, the duty cycle of the PWM signal is controlled by the clock signal CLK and the sensed current signal. In particular, the clock signal CLK determines the PWM signal frequency and the sensed current signal determines the duty cycle of the PWM signal—that is, the percentage of time the power switch in the power stage is ON relative to the total period of the switching cycle. By controlling the duty cycle of the power switches in the power stage, the switching voltage regulator can regulate the output voltage.

In the present description, references to the "on-duration" of the PWM signal refers to the logical state of the PWM signal associated with the charge phase of the output inductor where the inductor current increases or ramps up (i.e. charging of the inductor by the power switches of the switching regulator). That is, the on-duration of the PWM signal is associated with the charge phase or the up-ramp of the inductor current. Meanwhile, references to the "off-duration" of the PWM signal refers to the logical state of the PWM signal associated with the discharge phase of the output inductor where the inductor current decreases or ramps down (i.e. discharging of the inductor by current flowing to the load). That is, the off-duration of the PWM signal is associated with the discharge phase or the down-ramp of the inductor current. In a peak current mode modulator, the modulator monitors the up-ramp of the inductor current to regulate the end of the on-duration of the PWM signal. In a valley current mode modulator, the modulator monitors the down-ramp of the inductor current to regulate the end of the off-duration of the PWM signal.

In a current mode control voltage regulator, the difference between the average inductor current and the dc value of the sensed inductor current can cause instability under certain operating conditions. The instability is sometimes referred to as subharmonic oscillation, which occurs when the inductor ripple current does not return to its initial value by the start of the next switching cycle under steady state load conditions. The instability is particularly problematic when the duty cycle exceeds 50%, that is, when the power switch is ON for more than 50% of a given switching period. To ensure stability, a slope compensation ramp is added to the current-sense signal to prevent or eliminate the subharmonic oscillation. In some examples, the slope compensation ramp is subtracted from the error signal $V_{COMP}$. For instance, by adding a compensating ramp signal to the sensed current signal, tendency towards subharmonic oscillation can be damped within one switching cycle.

Examples of slope compensation techniques that can be applied in the current mode control voltage regulator of the present disclosure are described in commonly assigned U.S. Pat. No. 10,833,661, entitled Slope Compensation For Peak Current Mode Control Modulator, issued Nov. 10, 2020 (the '661 patent), and copending and commonly assigned U.S. patent application Ser. No. 17/035,012, entitled Slope Compensation For Current Mode Control Modulator, filed Sep. 28, 2020 (the '012 application), which patent and patent application are incorporated herein by reference for all purposes.

More specifically, in FIG. 1, the current mode hysteretic modulator 12 implements a voltage control loop through the feedback voltage $V_{FB}$ and a current control loop through the sensed current signal ILn. In the example shown in FIG. 1, the current control loop is implemented by receiving a sensed current signal ILn indicative of the inductor current at the inductors Ln of the respective power stages 20. In the '661 patent and the '012 application, the current control loop of a current mode control modulator is implemented using an emulated or synthesized current signal. That is, the modulator does not have to receive a sensed inductor current value for the current control loop. Instead, the modulator generates an emulated current signal indicative of an expected inductor current waveform for the current control loop. In the present description, the expected inductor current waveform is referred to as the current mode signal or the current loop signal and is indicative of the expected inductor current behavior at a respective power stage of the voltage regulator. In one example, the current loop signal is a synthesized ramp signal replicating the expected inductor current waveform. Furthermore, the '661 patent and the '012 application describe various circuits and methods to generate the synthesized ramp signal with slope compensation integrated therein.

For example, the '661 patent and the '012 application describe various configurations of a ramp signal generator for generating a synthesized ramp signal with integrated slope compensation for various topologies of the current mode hysteretic modulator, including peak current mode and valley current mode, each in buck or boost or buck-boost configuration. The circuits and methods described in the '661 patent and the '012 application generates an emulated current signal indicative of the expected inductor current waveform with slope compensation incorporated therein. More specifically, the '661 patent and the '012 application describe a ramp signal generator that is implemented using a switched capacitor circuit with appropriate charge scaling to generate the ramp signal with optimal slope compensation. Embodiments of the present disclosure incorporate the ramp signal generator described in the '661 patent and the '012 application, as will be described in more detail below.

Multi-phase switching power supplies need static and dynamic current sharing between each phase for optimal operation. Static current sharing between phases, also referred to as DC accuracy, is commonly achieved through a slow regulation loop that monitors each phase current with respect to the others and modifies each phase's pulse-width modulation (PWM) signal to correct their respective currents, so the phase currents are balanced or equal between the phases. Dynamic current sharing, also referred to as AC accuracy, is generally achieved through selection of the switching architecture. For example, in a step-down DC-DC converter ("buck"), a hysteretic current-mode architecture provides relatively good dynamic current balance. However, over a wide range of systems and compensation values, AC accuracy can degrade, especially in the fastest corners of dynamic operation.

Referring back to FIG. 1, traditional voltage regulator includes a voltage control loop to maintain a constant output voltage $V_{OUT}$ by adjusting the duty cycle of the PWM signals based on the voltage control loop error signal $V_{COMP}$ to achieve pulse width modulation based on the measured error between the feedback voltage $V_{FB}$ and the desired target $V_{TARG}$. In some examples, to maintain current balance between Phase 1 (IL1), Phase 2 (IL2), and Phase 3 (IL3), traditional voltage regulator may include a phase current balance loop which senses the inductor currents of the phases, also referred to as the phase currents, and generates another control signal to adjust the duty cycle of the PWM signals.

Because these two control loops act on the same control variable—the PWM duty cycle, one of the control loops must dominate. Because the ultimate goal of the voltage regulator is to maintain constant $V_{OUT}$, the voltage control loop usually dominates the response. That is, the voltage control loop has higher gain and bandwidth as compared to the phase current balance loop. As a result, the voltage regulator can achieve good inter-phase current balance at lower frequencies, where the phase current balance loop has sufficient gain. However, at higher frequencies, the gain of the phase current balance loop drops off and the current balance becomes unregulated and can diverge under large dynamic operation of the system.

More specifically, during large load transient events, the modulator of the voltage regulator responds to change the duty cycle of the PWM signals of the phases to match the new voltage regulation level. For a period after a load transient event, the phase currents may become out of balance. Under ideal conditions, the modulator will drive the phase currents to become balanced again as soon as possible. In one example, the load steps from 0 A to 120 A, the ideal operating condition is for the modulator to ramp up the phase current for the three phases together so that the three phases each deliver 40 A. However, traditional control schemes are often inadequate during large transient events to keep the phase currents in balance. As a result, during large transient events, the phases become unbalanced with some phase carrying more current than others and the modulator and the phases become out of sync with each other. The traditional control schemes may take a long time to settle back into the balanced condition where the phase currents are equal.

Embodiments of the present disclosure provides a multi-phase current mode control modulator implementing a phase current balance control loop capable of achieving fast current balance in a voltage regulator, including during large transient load changes. The phase current balance control loop of the present disclosure is operative to keep the phase currents balanced and to keep the phases in sync during fast transient load changes. That is, during transient load events, the phase current balance control loop of the present disclosure is operative to keep the phase currents at about the same current load and also control the phases to very quickly return to regular phase spacing after a transient event.

Figure 3:
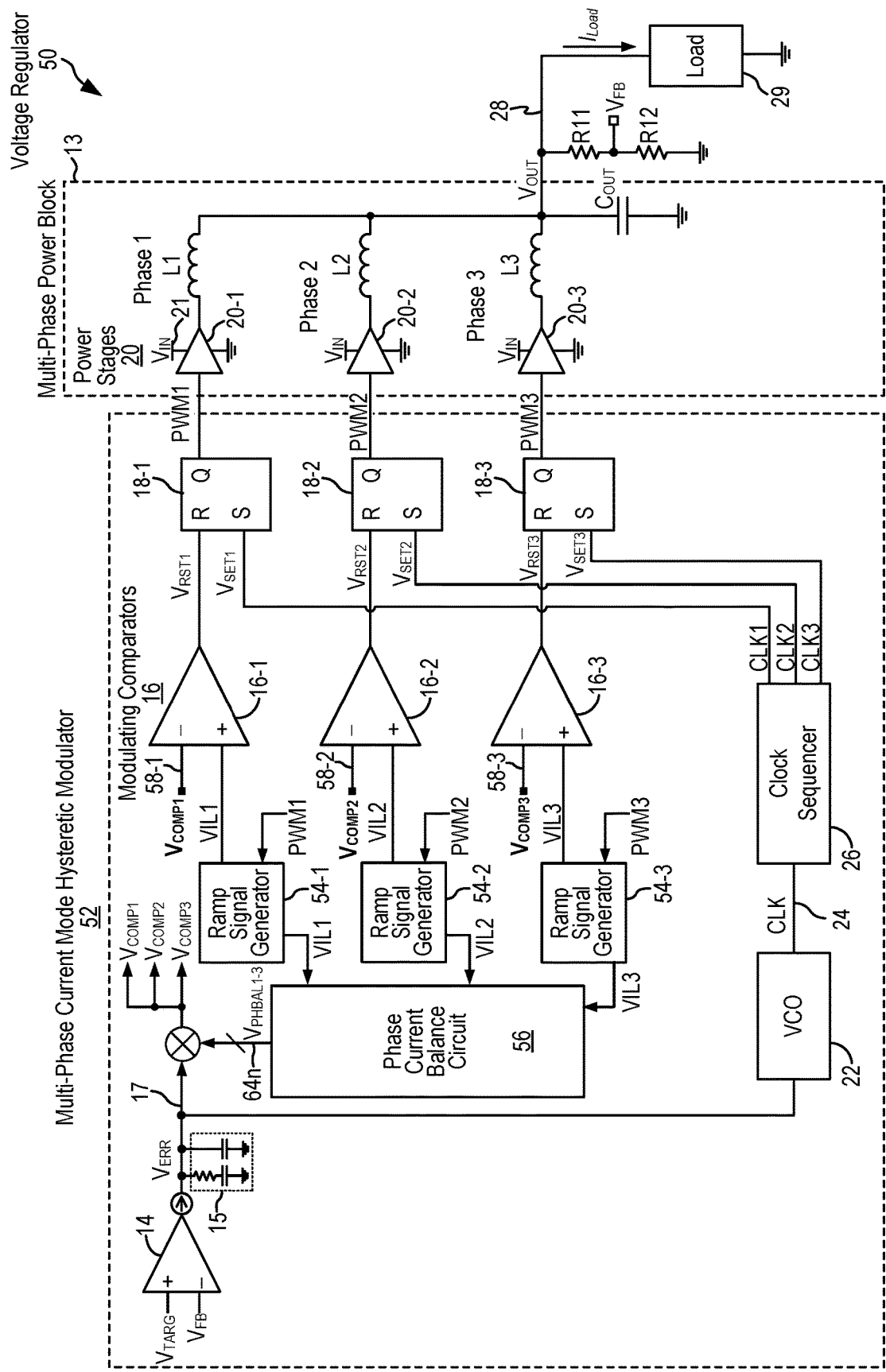
FIG. 3 is a schematic diagram of a voltage regulator incorporating a multi-phase current mode hysteretic modulator implementing a phase current balance control loop in embodiments of the present disclosure.

FIG. 3 is a schematic diagram of a voltage regulator incorporating a multi-phase current mode hysteretic modulator implementing a phase current balance control loop in embodiments of the present disclosure. Like elements in FIGS. 1 and 3 are given like reference numerals to simplify the discussion. Referring to FIG. 3, a voltage regulator 50 includes a multi-phase current mode hysteretic modulator 52 ("modulator 52") coupled to drive a multi-phase power block 13. In the present embodiment, the multi-phase modulator 52 includes three phases (Phase 1, Phase 2 and Phase 3) and the power block 13 includes three power stages 20-1 to 20-3 for each phase with associated output inductors L1 to L3. An output capacitor Com' is connect to the output terminal 28 to provide a regulated output voltage \Toth' the output terminal. The power stages 20-1 to 20-3 receives the input voltage $V_{IN}$ (node 21) and operate under the control of the PWM signals generated by the modulator 52 to provide the output voltage \Toth' on the output terminal 28 for supplying a load 29.

The multi-phase current mode hysteretic modulator 52 includes an error amplifier 14 receiving the feedback voltage $V_{FB}$ and the target voltage $V_{TARG}$ to generate a voltage control loop error signal $V_{ERR}$ (node 17). The error signal $V_{ERR}$ is coupled to a voltage-controlled oscillator (VCO) 22 to generate the clock signal CLK (node 24) which is divided into three clock phases CLK1, CLK2 and CLK3 by the clock sequencer 26. The clock signals CLK1-CLK3 are coupled to a set of latch circuits 18-1 to 18-3 as the set signals $V_{SET1}$ to $V_{SET3}$ respectively. In the present example, the latch circuits 18-1 to 18-3 are each a set-reset flip-flop circuit. The modulator 52 includes a set of modulating comparators 16-1 to 16-3, each modulating comparator 16 corresponding to one phase of the multi-phase voltage regulator. The modulating comparators 16-1 to 16-3 generate the reset signals VRST for the latch circuits 18-1 to 18-3 respectively. The latch circuits 18-1 to 18-3 generate the multi-phase PWM signals PWM1 to PWM3 to drive the respective power stages 20-1 to 20-3 in the multi-phase power block 13. Each of power stages 20-1 to 20-3 are driven in separate phases.

In embodiments of the present disclosure, the current mode hysteretic modulator 52 implements a voltage control loop through the feedback voltage $V_{FB}$ and a current control loop using a synthesized current loop signal generated in the modulator 52. No sensed inductor current is needed to implement the current control loop. According to embodiments of the present disclosure, the current mode hysteretic modulator 52 incorporates a ramp signal generator 54 to generate a ramp signal as the current loop signal indicative of the expected inductor current waveform for the current control loop for each phase. Furthermore, the ramp signal generator 54 generates the ramp signal with slope compensation incorporated therein so that separate slope compensation circuit is not needed. In the multi-phase modulator 52, separate ramp signal generators 54-1 to 54-3 are provided for each phase of the modulator. In particular, for each phase n, the ramp signal generator 54n receives the respective pulse-width modulation signal PWMn and generates a ramp signal VILn which is provided to the non-inverting input terminal of the respective modulating comparator 16n to form the current control loop.

In embodiments of the present disclosure, the current mode hysteretic modulator 52 can be configured as a buck modulator for stepping down the input voltage or a boost modulator for stepping up the input voltage, or a buck-boost modulator implementing both step-up and step-down functions. Furthermore, in embodiments of the present disclosure, the current mode hysteretic modulator can be configured for peak current mode control or valley current mode control. The exact topology of the modulator 52 is not critical to the practice of the present disclosure.

In some embodiments, the ramp signal generators 54-1 to 54-3 are implemented using the circuits and method described in the aforementioned '661 patent and the '012 application. In particular, the '661 patent and the '012 application describe various configurations of a ramp signal generator for generating an emulated ramp signal with integrated slope compensation for various topologies of the current mode hysteretic modulator, including peak current mode and valley current mode, each in buck or boost or buck-boost configuration. In some embodiments, the ramp signal generators 54-1 to 54-3 in the modulator 52 are each constructed as a switched capacitor circuit with appropriate charge scaling to generate the ramp signal with optimal slope compensation. Each ramp signal generator 54n generates a ramp signal with slope compensation integrated therein as the emulated phase current signal VILn for a phase n of the modulator 52. In other embodiments, other circuits and methods for generating an emulated phase current signal with slope compensation can be used. The circuits and methods in the '661 patent and the '012 application are illustrative only and not intended to be limiting.

In embodiments of the present disclosure, the modulator 52 includes a phase current balance circuit 56 to implement a phase current balance control loop for providing fast current balance between the phases. In particular, the phase current balance control loop implemented by the phase current balance circuit 56 realizes a control loop that is orthogonal to the voltage control loop. In this way, the voltage control loop is not overly disturbed when each phase attempts to correct its phase current relative to the other phases.

A salient feature of the phase current balance circuit 56 of the present disclosure is that the phase current balance control loop generates individual phase control signal $V_{COMPn}$ for phase current balancing for each phase. In some embodiments, the phase control signal $V_{COMPn}$ contains an "equal and opposite" control input based on the phase current of a phase n relative to the real-time instantaneous average current of all phases. The average or total impact of each individual phase control signal on the voltage control loop remains equivalent to the single, combined phase control signal. However, each phase control signal $V_{COMPn}$ is now able to act to drive its phase current to balance with the others.

In embodiments of the present disclosure, the phase current balance circuit 56 receives the emulated phase current signals VIL1, VIL2 and VIL3 generated by the ramp signal generators 54-1 to 54-3. For each phase of the modulator 52, the phase current balance circuit 56 generates a phase current balance signal $V_{PHBALn}$ (node 64) indicative of a difference between each phase current VILn and an average of all the phase currents. Each phase current balance signal $V_{PHBALn}$ is combined with the voltage control loop error signal $V_{ERR}$ to generate the respective phase control signal $V_{COMPn}$. The individual phase control signal $V_{COMPn}$ is then coupled to the inverting input terminal of the respective modulating comparator 16n. That is, for Phase 1, the phase current balance circuit 56 generates a phase control signal $V_{COMP1}$ which is coupled to the inverting input terminal of the modulating comparator 16-1. For Phase 2, the phase current balance circuit 56 generates a phase control signal $V_{COMP2}$ which is coupled to the inverting input terminal of the modulating comparator 16-2. For Phase 3, the phase current balance circuit 56 generates a phase control signal $V_{COMP3}$ which is coupled to the inverting input terminal of the modulating comparator 16-3. The modulator 52 of the present disclosure is distinguished from the traditional modulators where the same voltage control loop error signal (sometimes referred to as $V_{ERR}$ or $V_{COMP}$) is applied to the modulating comparators of all the phases, such as shown in the example in FIG. 1.

Another salient feature of the phase current balance circuit 56 of the present disclosure is that the phase current balance circuit 56 uses the emulated phase current signals with slope compensation integrated therein for performing phase current balancing. In this manner, the phase current balance control loop achieves greater stability.

Figure 4:
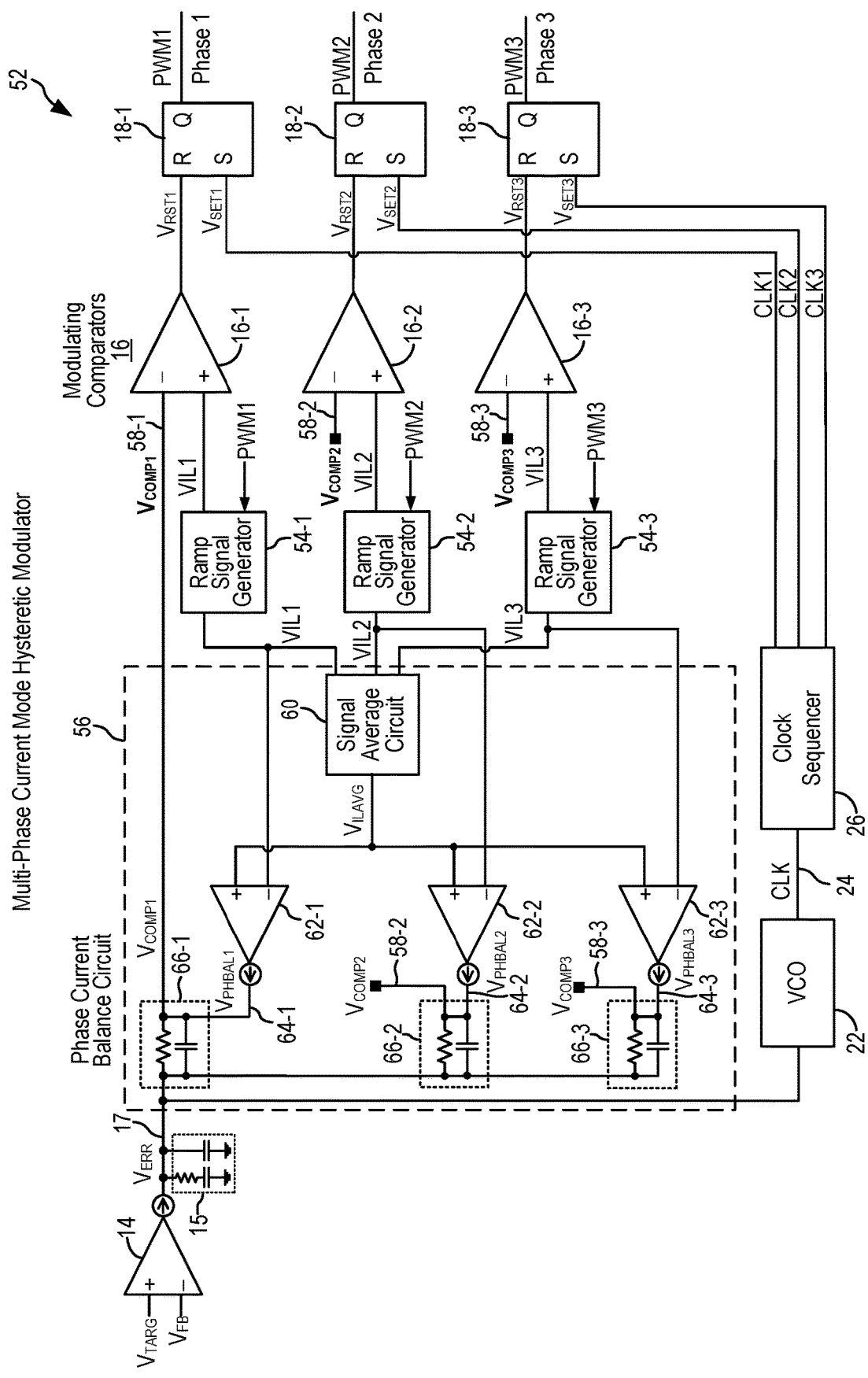
FIG. 4 is a schematic diagram of a multi-phase current mode hysteretic modulator implementing a phase current balance circuit in embodiments of the present disclosure.
Figure 5:
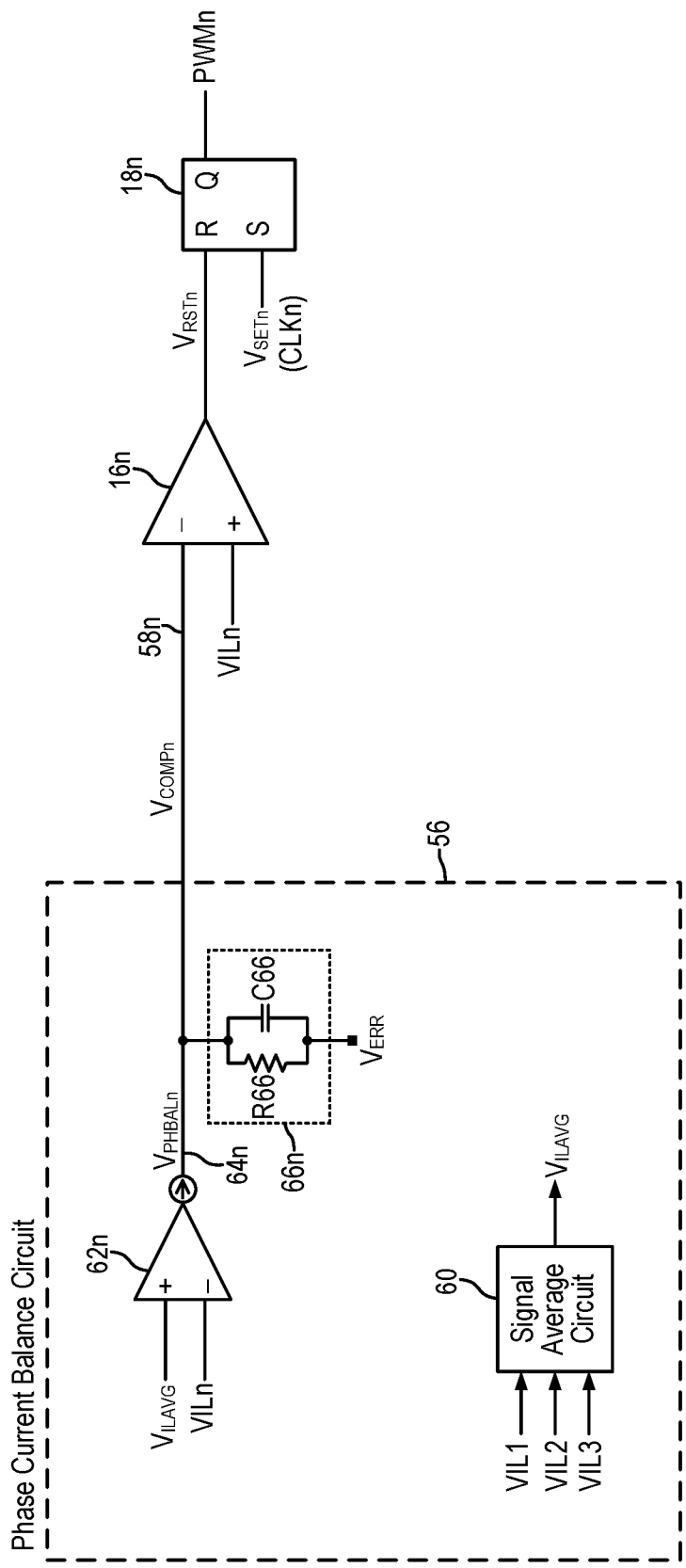
FIG. 5 is a simplified schematic diagram illustrating one phase of the phase current balance circuit in some embodiments.

The detail construction of the phase current balance circuit 56 is illustrated in FIGS. 4 and 5. FIG. 4 is a schematic diagram of a multi-phase current mode hysteretic modulator implementing a phase current balance circuit in embodiments of the present disclosure. FIG. 5 is a simplified schematic diagram illustrating one phase of the phase current balance circuit in some embodiments. Like elements in FIGS. 3, 4 and 5 are given like reference numerals to simplify the discussion. In the following description, FIG. 4 illustrates a modulator including three phases (Phase 1, Phase 2, Phase 3) for illustration whereas FIG. 5 illustrate one of the phases (Phase n) representative of any one of the phases in FIG. 4. Referring to FIGS. 4 and 5, a phase current balance circuit 56 receives the emulated phase current signals VIL1, VIL2, VIL3 generated by the ramp signal generators 54-1, 54-2, 54-3. The phase current balance circuit 56 includes a signal average circuit 60 which receives the emulated phase current signals VIL1, VIL2, VIL3 and provide an average phase current signal $V_{ILAVG}$ being an average of the emulated phase current signals VIL1, VIL2, VIL3. In some embodiments, the signal average circuit 60 provides a real-time average of the emulated phase current signals VIL1, VIL2, VIL3. In one embodiment, the average phase current signal $V_{ILAVG}$ is the quotient of the sum of the emulated phase current signals of N phases divided by N.

The phase current balance circuit 56 includes a set of amplifier circuits 62 to compare the average phase current signal to the individual emulated phase current signals. In particular, an amplifier 62n receives the average phase current signal $V_{ILAVG}$ on an inverting input terminal and receives the emulated phase current signal VILn for a phase n at the non-inverting input terminal. The amplifier circuit 62n generates a phase current balance signal $V_{PHBALn}$ (node 64n) indicative of a difference between the emulated phase current signal VILn and the average phase current signal $V_{ILAVG}$. The difference may be amplified by the amplifier circuit 62n. In embodiments of the present disclosure, the phase current balance signal $V_{PHBALn}$ (node 64n) can be a voltage signal or a current signal. In the present embodiment, the set of amplifier circuits 62-1 to 62-3 are each an operational transconductance amplifier (OTA) providing an output current indicative of the difference between the emulated phase current signal VILn and the average phase current signal $V_{ILAVG}$. The output current indicative of the different is converted to a voltage signal at a parallel resistor-capacitor circuit 66n. The resulting phase current balance signal $V_{PHBALn}$ is therefore a voltage signal in the present embodiment.

Furthermore, in embodiments of the present disclosure, for each phase n, the phase current balance signal $V_{PHBALn}$ is combined with the voltage control loop error signal $V_{ERR}$ (node 17). In other words, the phase current balance signal $V_{PHBALn}$ may be added to or subtracted from the voltage control loop error signal $V_{ERR}$. The combined signal is the phase control signal $V_{COMPn}$ for the respective phase n. In the present embodiment, the voltage control loop error signal $V_{ERR}$ (node 17) is combined with each phase current balance signal $V_{PHBALn}$ at the parallel resistor-capacitor circuit 66n. In particular, each parallel resistor-capacitor circuit 66n includes a resistor R66 and a capacitor C66 connected in parallel. The voltage control loop error signal $V_{ERR}$ (node 17) is connected to one end of the parallel circuit while the phase current balance signal $V_{PHBALn}$ is connected to the other end of the parallel circuit.

The phase current balance circuit 56 generates individual phase control signals $V_{COMPn}$ for each phase of the modulator 52 and provides the individual phase control signals to respective modulating comparators to complete the phase current balance control loop. As thus configured, the phase current balance control loop generates the phase control signals $V_{COMPn}$ to force the emulated phase current signal VILn for each phase to the average phase current value.

For example, amplifier circuit 62-1 generates the phase current balance signal $V_{PHBAL1}$ (node 64-1) which is converted to a voltage signal combined with the error signal $V_{ERR}$ by the parallel resistor-capacitor circuit 66-1. The phase control signal $V_{COMP1}$ thus generated is provided to the inverting input terminal 58-1 of the modulator comparator 16-1 of Phase 1. Meanwhile, the amplifier circuit 62-2 generates the phase current balance signal $V_{PHBAL2}$ (node 64-2) which is converted to a voltage signal combined with the error signal $V_{ERR}$ by the parallel resistor-capacitor circuit 66-2. The phase control signal $V_{COMP2}$ thus generated is provided to the inverting input terminal 58-2 of the modulator comparator 16-2 of Phase 2. The amplifier circuit 62-3 generates the phase current balance signal $V_{PHBAL3}$ (node 64-3) which is converted to a voltage signal combined with the error signal $V_{ERR}$ by the parallel resistor-capacitor circuit 66-3. The phase control signal $V_{COMP3}$ thus generated is provided to the inverting input terminal 58-3 of the modulator comparator 16-3 of Phase 3.

In modulator 52, each phase receives an individual phase control signals $V_{COMPn}$ to control the phase current for that phase to achieve current balancing. More specifically, the individual phase control signals $V_{COMPn}$ (node 58n) is coupled to the inverting input terminal of the modulating comparator 16n to be compared with the emulated phase current signal VILn coupled to the non-inverting input terminal. The modulating comparator 16n generates a duty cycle control signal for controlling the duty cycle of the PWM signal PWMn of the respective phase. In the present embodiment, the duty cycle control signal is the reset voltage signal $V_{RSTn}$ which is coupled to the Reset input terminal of the latch circuit 18n to generate the PWM signal PWMn. The duty cycle control signal or the reset voltage signal $V_{RSTn}$ operates to terminate the on-duration of the PWM signal, thereby controlling the duty cycle of the PWM signal.

In embodiments of the present disclosure, the phase current balance circuit realize variable gain control for the phase current balance control loop by tuning the amplifier circuits 62n to adjust the gain of the amplifier circuits. In the present embodiment, the gain of the operational transconductance amplifiers 62n can be tuned to realize the desired gain level for the phase current balance control loop. For example, the gain of an OTA can be tuned by coupling a given resistance values at the output terminal of the OTA.

FIG. 6, which includes FIGS. 6(a) and 6(b), illustrates exemplary signal average circuits which can be incorporated in the phase current balance circuit in embodiments of the present disclosure. Referring to FIG. 6(a), a signal average circuit 70 includes two operational transconductance amplifiers (OTAs) 72, 73 receiving respective phase current signals to be averaged, for example, emulated phase currents VIL1 and VIL2. The OTAs 72, 73 have the same gain value K. The output terminals of the OTAs 72, 73 are connected to a common node 74. A resistor R70 is connected between the common node 74 and the ground potential to develop a voltage Vx indicative of the average current value of the emulated phase currents VIL1 and VIL2.

Referring to FIG. 6(b), a signal average circuit 75 includes two amplifiers 76, 78 receiving respective phase current signals to be averaged, for example, emulated phase currents VIL1 and VIL2. The amplifiers 76, 78 are configured in a unity gain configuration. The output terminal of amplifier 76 is coupled through a resistor R75-1 to a common node 79. The output terminal of amplifier 78 is coupled through a resistor R75-2 to the common node 79. Resistors 75-1 and 75-2 have the same resistance values. A voltage Vx is developed at node 79 indicative of the average current value of the emulated phase currents VIL1 and VIL2.

In the example herein, the voltage Vx is given as:

$$Vx = \text{Avg}(VIL1, VIL2) = 0.5 * (VIL1 + VIL2).$$

In the signal average circuits shown in FIG. 6, circuits for computing an average of two signals are shown. One of ordinary skill in the art would appreciate that a signal average circuit for N number of signals can be constructed accordingly. Furthermore, the signal averaging circuits of FIGS. 6(a) and 6(b) are illustrative only and not intended to be limiting. Other circuits for producing an average of two signals may be used.

Figure 7:
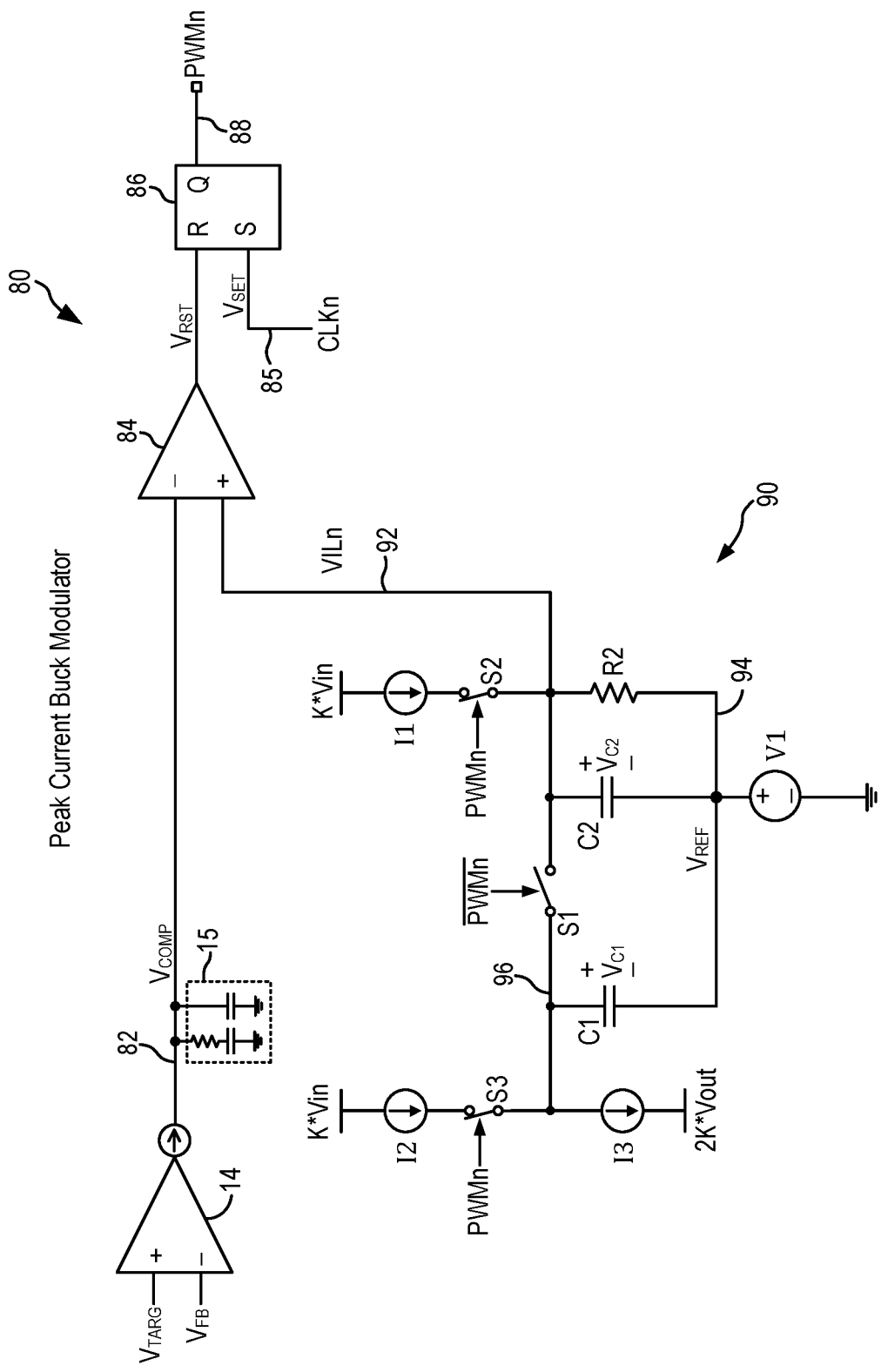
FIG. 7 duplicates FIG. 7 of the '661 patent and illustrates a schematic diagram of a ramp signal generator with slope compensation incorporated in a peak current mode buck modulator which can be incorporated into the current mode control modulator in embodiments of the present disclosure.

FIG. 7 duplicates FIG. 7 of the '661 patent and illustrates a schematic diagram of a ramp signal generator with slope compensation incorporated in a peak current mode buck modulator which can be incorporated into the current mode control modulator in embodiments of the present disclosure. FIG. 7 illustrates one example of a ramp signal generator which can be used to generate an emulated phase current signal with slope compensation. Referring to FIG. 7, a ramp signal generator 90 is incorporated into a current mode control hysteretic modulator 80. In embodiments of the present disclosure, the current mode control hysteretic modulator 80 refers to a modulator incorporating a current control loop, usually in conjunction with a voltage control loop. In present embodiments, the current mode control hysteretic modulator is a peak current mode hysteretic buck modulator, also referred to as a peak current mode buck modulator in the present description. A peak current mode modulator controls the duty cycle of the power switches in response to the peak of the current loop signal which is indicative of the expected inductor current waveform for the current control loop. Furthermore, in the present embodiments, the peak current mode modulator 80 uses a synthesized current loop signal for the current control loop and does not require a sensed inductor current signal to be fed back to the modulator.

In particular, the modulator 80 includes an error amplifier 14 receiving the feedback voltage $V_{FB}$ and the target voltage $V_{TARG}$ to generate an error signal $V_{COMP}$ on a node 82. In one example, the error amplifier 14 is a transconductance amplifier and generates an output current signal which is converted to a voltage signal by a loop filter 15 coupled to the output node 82. The error signal $V_{COMP}$ on node 82 is therefore a voltage signal in the present example. The error signal $V_{COMP}$ is coupled to the inverting input terminal of a modulating comparator 84. The ramp signal generator 90 generates a ramp signal $V_{RAMP}$ (node 92) which is provided to the non-inverting input terminal of the modulating comparator 84. The modulating comparator 84 generates the reset signal VRST which is coupled to the Reset input terminal of a latch circuit 86. The latch circuit 86 receives a clock signal CLK, generated by a voltage-controlled oscillator (not shown) in response to the error signal $V_{COMP}$, as the set signal $V_{SET}$ which is coupled to the Set input terminal of the latch circuit 86. In one example, the latch circuit 86 is a flip-flop circuit. The latch circuit 86 generates a pulse-width modulation signal PWM on an output node 88. In the case the modulator 80 is a multi-phase modulator, the schematic diagram in FIG. 7 is representative of a single phase n of the modulator 80. The modulating comparator 84 receives a ramp signal $V_{RAMPn}$ and generates the reset signal for the latch circuit 86. The latch circuit 86 also receives the clock signal CLKn as the set signal. The latch circuit 86 generates a pulse-width modulation signal PWMn on the output node 88 for the phase n of the multi-phase modulator.

In embodiments of the present disclosure, the ramp signal generator 90 generates the ramp signal $V_{RAMP}$ (node 92) using a switched capacitor circuit. The ramp signal $V_{RAMP}$ thus generated contains information about the expected inductor current waveform, when combined with the voltage at node 92, and also incorporates slope compensation. Accordingly, the ramp signal generator 90 has incorporated therein slope compensation while generating the ramp signal as the current loop signal. No additional slope compensation circuit is needed.

The ramp signal generator 90 includes a capacitor C1 coupled between a node 96 and a node 94 and a capacitor C2 coupled between the node 92 and the node 94. The node 94 is biased to a reference voltage $V_{REF}$, such as through a voltage source V 1. A switch S1 is coupled between the capacitors C1 and C2 (that is, between nodes 96 and 92) to form the switched capacitor circuit. The switch S1 is controlled by a signal indicative of the pulse-width modulation signal PWM. In particular, the switch S1 is controlled by the inverse of the pulse-width modulation signal PWM so that the switch S1 is open in response to the on-duration of the pulse-width modulation signal PWM and the switch S1 is closed in response to the off-duration of the pulse-width modulation signal PWM.

The ramp signal generator 90 includes a first current source I1 providing a current proportional to the input voltage $V_{IN}$. In one embodiment, the first current source I1 provides a current proportional to K times the input voltage $V_{IN}$, K being a number greater than 0. The first current source I1 is connected to node 92 through a switch S2 controlled by the pulse-width modulation signal PWM to provide current to node 92 during the on-duration of the PWM signal. The ramp signal generator 90 further includes a second current source 12 providing a current proportional to the input voltage $V_{IN}$ and a first current sink 13 providing a current proportional to two times the output voltage $V_{OUT}$. In one embodiment, the second current source 12 provides a current proportional to K times the input voltage $V_{IN}$ and the first current sink 13 provides a current proportional to 2K times the output voltage $V_{OUT}$. The second current source 12 is connected to node 96 through a switch S3 controlled by the pulse-width modulation signal PWM to provide current to node 96 during the on-duration of the PWM signal. Meanwhile, the first current sink 13 is directly connected to node 96 to sink a current from node 96.

In some embodiments, the ramp signal generator 90 further includes a resistor R2 coupled between the node 92 and the node 94, that is, in parallel with the capacitor C2. The resistor R2 removes the DC component of the ramp signal at node 92, leaving only the AC component (or the triangular ripple) of the ramp signal where the AC component tracks the up-ramp and down-ramp of the inductor current waveform. The resistor R2 is optional and may be omitted in other embodiments of the present disclosure. The use of resistor R2 improve DC biasing and transient performance.

In some embodiments, capacitor C1 and capacitor C2 have the same capacitance values. In other embodiments, the capacitors C1 and C2 can have different capacitance values to adjust the amount of slope compensation being provided, as described in more details below.

In operation, the ramp signal generator 90 generates a slope compensated ramp signal $V_{RAMP}$ using the switched capacitor circuit of capacitors C1, C2 and the switch S1. The ramp signal VRAMP has an up-ramp portion when the ramp signal ramps up or increases. The ramp signal VRAMP has a down-ramp portion when the ramp signal ramps down or decreases. In the present embodiment, for the peak current mode buck modulator 80, the ramp signal generator 90 generates the ramp signal $V_{RAMP}$ by splitting or dividing the charge of the expected current mode signal in the up-ramp portion across the two capacitors C1 and C2 and sharing the charge between the two capacitors C1 and C2 in the down-ramp portion.

More specifically, optimal slope compensation is achieved when the slope compensation ramp rate equals that ramp rate of the current mode signal (the inductor current waveform to be replicated). For instance, for the peak current mode buck modulator, the current mode signal has a down ramp rate or down slope of $-gm^*V_{OUT}/C$. To achieve optimal slope compensation control, the slope for the down-ramp of the ramp signal should be set to $-gm^*V_{OUT}/C$.

In embodiments of the present embodiment, the ramp signal generator 90 generates the ramp signal with optimal slope compensation by subtracting out a given amount of signal during the PWM on-duration and then during the PWM-off curation, the ramp signal generator 90 ensures the ramp signal returns to the desired position having the desired slope.

To replicate the inductor current waveform in a peak current mode operation in a buck converter, the ramp signal, without slope compensation, should have a current upslope (or up-ramp) being proportional to $(V_{IN}-V_{OUT})$ during the PWM on-duration and a current downslope (or down-ramp) being proportional to $-V_{OUT}$ during the PWM off-duration. That is, the ramp signal, without slope compensation, should matches the ramp rates of the current mode signal (the inductor current waveform).

In the peak current mode buck modulator of the present disclosure, the ramp signal generator implements slope compensation by matching the ramp signal downslope to the current downslope of the current mode signal during the PWM off-duration. As thus configured, the PWM on-duration is shortened by an amount equal to the case if the $V_{OUT}$ term were removed from the ramp upslope. Accordingly, to introduce slope compensation to the ramp signal, the ramp signal upslope is made proportional to $V_{IN}$, instead of having the ramp signal upslope being proportional to $(V_{IN}-V_{OUT})$, as in the case without slope compensation.

The ramp signal generator 90 realizes ramp signal generation and slope compensation by using the switched capacitor circuit to divide the charge associated with the current mode signal during the up-ramp among the two capacitors and to share the charge associated with the current mode signal during the down-ramp, while conserving the total charge over a given switching cycle. As thus configured, capacitor C2 provides the ramp signal up-ramp and the capacitors C1 and C2 in parallel provide the ramp signal down-ramp. During the PWM on-duration with switch S1 being open and switches S2 and S3 being closed, the capacitor C2 is charged by a current with the $V_{OUT}$ term removed. That is, the capacitor C2 is charged by a current proportional to $K*V_{IN}$ during the PWM on-duration. With the switch S1 open, the ramp signal $V_{RAMP}$ (node 92) is the voltage $V_{C2}$ across the capacitor C2. In this manner, the ramp signal $V_{RAMP}$ (node 92) has an up-ramp incorporating slope compensation. The ramp signal $V_{RAMP}$ ramps up during the PWM on-duration to provide an up-ramp with slope compensation to the modulating comparator 84.

Also during the PWM on-duration, the capacitor C1 accumulates the missing charge that would be put on capacitor C2 when slope compensation is not implemented. In particular, the capacitor C1 is being charged by the second current source 12 (through switch S3) and the first current sink 13 to a voltage proportional to $K*V_{IN}-2K*V_{OUT}$. The voltage $V_{C1}$ on capacitor C1 ramps up to store the charge not included on capacitor C2 while switch S1 is open.

Under the peak current control scheme, when the ramp signal $V_{RAMP}$ reaches the error signal $V_{COMP}$ (node 82), the modulating comparator 84 is triggered and the PWM signal is reset. The PWM on-duration ends and the PWM off-duration begins. Accordingly, switch S1 is closed and switches S2 and S3 are open. As a result, capacitors C1 and C2 are connected in parallel and are disconnected from the current sources I1 or I2. That is, nodes 92 and 96 are shorted together. The charge accumulated on capacitors C1 and C2 is shared and the ramp signal $V_{RAMP}$ becomes the average of the capacitor voltages $V_{C1}$ and $V_{C2}$. As a result of the charge sharing, the ramp signal $V_{RAMP}$ begins the down-ramp at the point where it should be if there was no slope compensation. That is, the ramp signal down-ramp has a slope of $-K*V_{OUT}$. In ramp signal generator 90, the effective capacitance is doubled by using capacitors C1 and C2 in parallel, but the first current sink 13 provides a current proportional to two times the output voltage $V_{out}$ and the ramp rates are therefore maintained. The ramp signal $V_{RAMP}$ ramps down until the next switching cycle is commanded by the clock signal CLK.

In embodiments of the present disclosure, the ramp signal generator 90 of FIG. 7 can be used to generate the emulated phase current signal VILn for each phase of the multi-phase current mode control modulator 52 in the above-described embodiments. It is instructive to note that FIG. 7 is provided to show construction of an exemplary ramp signal generator circuit. The remaining circuit connections of the modulator 80 in FIG. 7 is illustrative only and not necessarily applicable to the modulator 52 of the present disclosure. In particular, modulator 80 of FIG. 7 does not include the implementation of the phase current balance control loop and therefore the error signal $V_{COMP}$ is provided directed to the modulating comparator 84, instead of being combined with a phase current balance signal to generate the phase control signal for each phase, as in the case of modulator 52 described above.

In the above-described embodiments, the current mode control modulator is implemented using single-ended signaling. In other embodiments, the current mode control modulator can be implemented using differential signaling. The specific signaling scheme employed is not critical to the practice of the present disclosure.

Figure 8A:
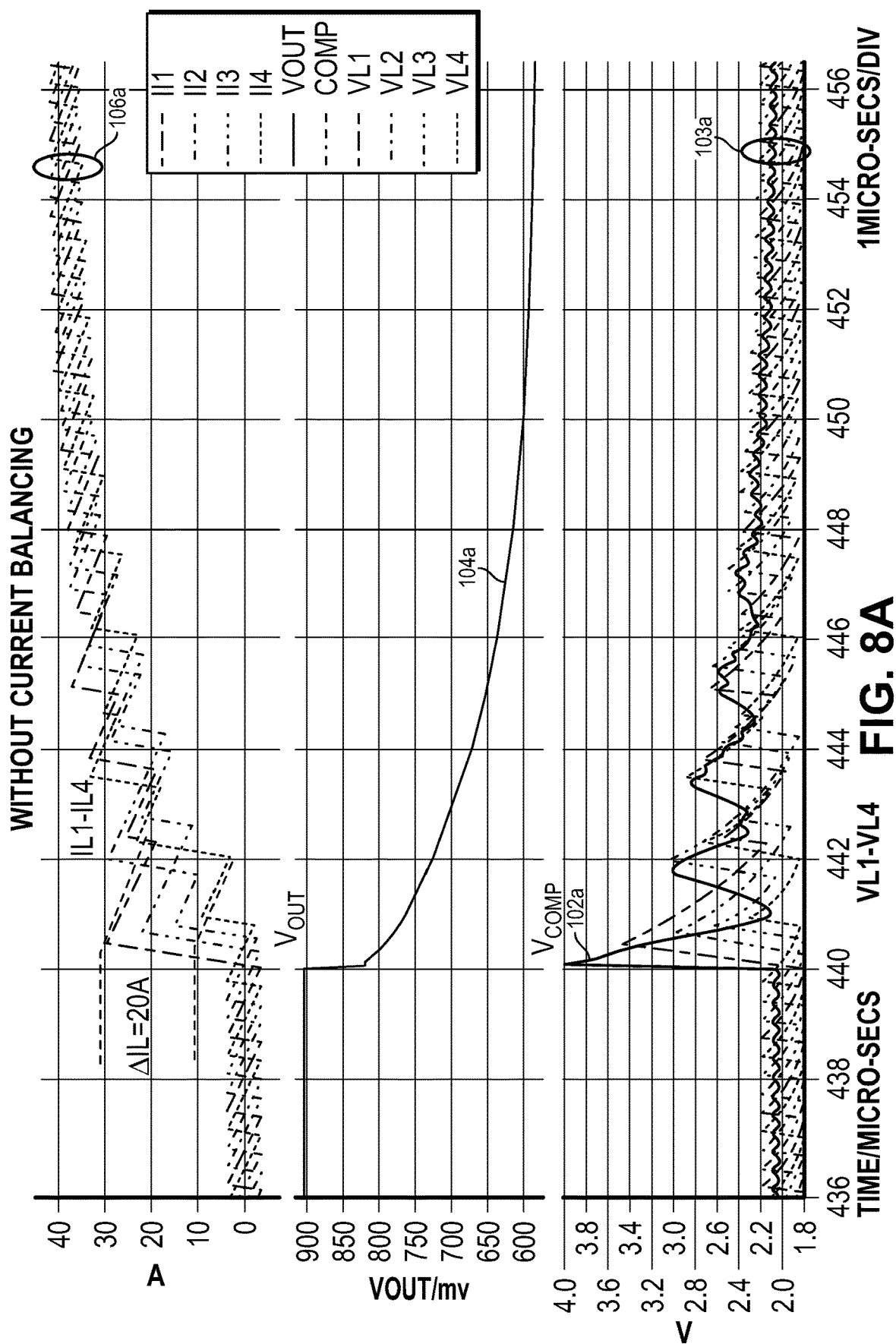
FIGS. 8A and 8B include signal waveforms showing the operational characteristics of a voltage regulator including a four-phase current mode hysteretic modulator in some examples.
Figure 8B:
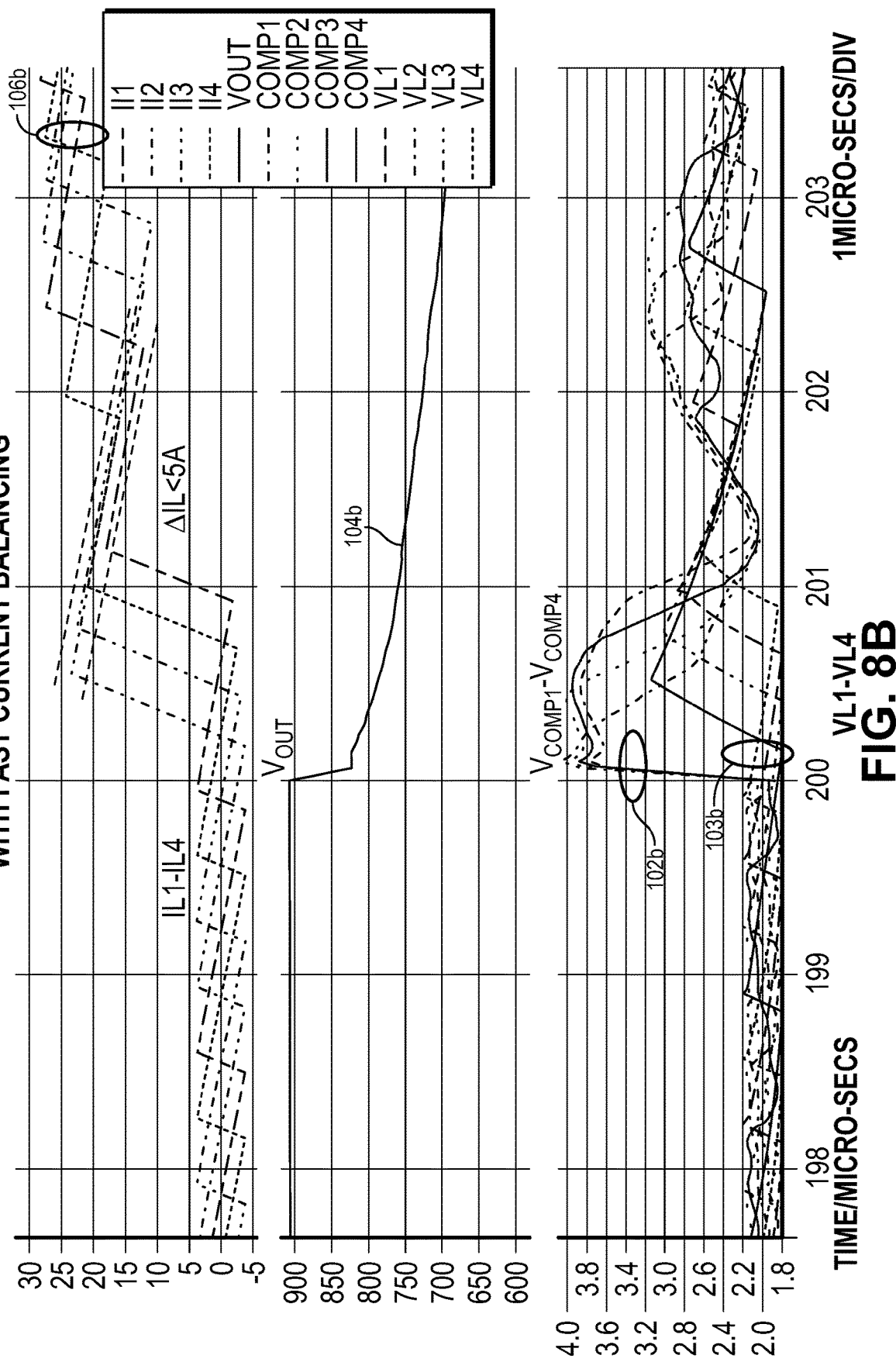

FIGS. 8A and 8B include signal waveforms showing the operational characteristics of a voltage regulator including a four-phase current mode hysteretic modulator in some examples. In particular, FIG. 8A illustrates signal waveforms for a four-phase modulator without implementing current balancing and FIG. 8B illustrates signal waveforms for a four-phase modulator implementing fast current balancing using the phase current balance control loop of the present disclosure described above. Referring to FIG. 8A, curve 102a illustrates the error signal $V_{COMP}$ as a result of a load step or step load changes. Curves 103a illustrate the voltages VL1 to VL4 indicative of the inductor current of the four phases in response to the load step. Curve 104a illustrates the output voltage $V_{OUT}$ of the voltage regulator. Curves 106a illustrates the behavior of the inductor currents IL1 to IL4 for the 4 phases in response to the load step. As shown in FIG. 8A, without fast current balancing, the current difference between the four phases is as large as 20 A. That is, the four phases in the modulator may be operated with a large difference in current loading for a long period in response to a load step change. Such an operation mode is undesirable.

Referring to FIG. 8B, when the modulator implements fast current balancing, the modulator generates a set of error signals $V_{COMP1}$ to $V_{COMP4}$ (curve 102b) as a result of a load step or step load changes. Curves 103b illustrate the voltages VL1 to VL4 indicative of the inductor current of the four phases in response to the load step. Curve 104b illustrates the output voltage $V_{OUT}$ of the voltage regulator. Curves 106ba illustrates the behavior of the inductor currents IL1 to IL4 for the 4 phases using fast current balancing in response to the load step. As shown in FIG. 8B, with the use of fast current balancing, the current difference between the four phases is less than 5 A due to the load changes. That is, the four phases in the modulator are only off balance for a short duration due to the load step change and the modulator can very quickly return to a stable operation state where the four phases share the load current equally. Note that FIGS. 8A and 8B are not on the same time scale. FIG. 8B has been enlarged in order to show the smaller amount of current difference between the phases.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided above along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The above detailed descriptions are provided to illustrate specific embodiments of the present invention and are not intended to be limiting. Numerous modifications and variations within the scope of the present invention are possible. The present invention is defined by the appended claims.

The invention claimed is:

1. A multi-phase current mode hysteretic modulator for generating a plurality of pulse width modulation (PWM) signals for driving a plurality of power stages in a plurality of phases, each power stage receiving an input voltage and delivering a phase current through a respective inductor to an output node to which an output capacitor and a load are connected, the plurality of PWM signals being generating in response to a feedback voltage signal indicative of a regulated output voltage at the output node, the current mode hysteretic modulator comprising:
   a phase current balance circuit configured to generate a phase current balance control signal for each phase to balance the phase current between the plurality of phases, the phase current balance control signal for each phase being indicative of a difference between a slope-compensated emulated phase current signal of the respective phase and an average phase current signal,
   wherein the phase current balance control signal for each phase is combined with a voltage control loop error signal and compared with the slope-compensated emulated phase current signal for the respective phase to generate a duty cycle control signal to control a duty cycle of the PWM signal of the respective phase, the duty cycle control signals being generated for the plurality of phases to control the phase currents delivered by the plurality of power stages.

2. The multi-phase current mode hysteretic modulator of claim 1, wherein the phase current balance control signal for each phase is combined with a voltage control loop error signal to generate a phase control signal for each phase; and wherein the phase control signal is compared to the slope-compensated emulated phase current signal for the respective phase to generate the duty cycle control signal for the respective phase.

3. The multi-phase current mode hysteretic modulator of claim 2, further comprising:
   a voltage control loop coupled to receive the feedback voltage signal indicative of the regulated output voltage and a target voltage and to generate the voltage control loop error signal indicative of a difference between the feedback voltage signal and the target voltage.

4. The multi-phase current mode hysteretic modulator of claim 3, wherein the voltage control loop comprises:
   a first error amplifier receiving the feedback voltage signal indicative of the regulated output voltage and the target voltage, the first error amplifier generating the voltage control loop error signal indicative of the difference between the feedback voltage signal and the target voltage on an output terminal;
   a plurality of modulating comparators, each modulating comparator being associated with a respective phase and having a first input terminal receiving the phase control signal of a respective phase and a second input terminal receiving the slope-compensated emulated phase current signal of the respective phase, each modulating comparator generating the duty cycle control signal for the respective phase, the duty cycle control signal being a reset signal; and
   a plurality of latch circuits, each latch circuit being associated with a respective phase and having a reset input terminal coupled to receive the reset signal from the modulating comparator of a respective phase, a set input terminal coupled to receive a clock signal of the respective phase, and an output terminal generating the PWM signal for the respective phase to drive the respective power stage, the PWM signal having an on-duration defining a duty cycle of the PWM signal and an off-duration, wherein the set signal initiates the on-duration of the PWM signal and the reset signal terminates the on-duration of the PWM signal.

5. The multi-phase current mode hysteretic modulator of claim 1, wherein the phase current balance circuit is coupled to receive slope-compensated emulated phase current signals generated for the plurality of phases, each slope-compensated emulated phase current signal being indicative of an expected current level of the phase current being delivered by a respective power stage and incorporating a slope compensation signal.

6. The multi-phase current mode hysteretic modulator of claim 1, further comprising:
   a plurality of ramp signal generator circuits, each ramp signal generator circuit being associated with a respective phase and receiving the PWM signal of a respective phase, each ramp signal generator circuit comprising a switched capacitor circuit implementing charge scaling to generate the slope-compensated emulated phase current signal for the respective phase.

7. The multi-phase current mode hysteretic modulator of claim 6, wherein the modulator comprises a peak current buck modulator and each of the plurality of ramp signal generators generates the slope-compensated emulated phase current signal having an up-ramp being proportional to the input voltage during the on-duration of the PWM signal of the respective phase and having a down-ramp being proportional to the output voltage during the off-duration of the PWM signal of the respective phase.

8. The multi-phase current mode hysteretic modulator of claim 1, wherein the phase current balance circuit further comprises:
   a signal average circuit receiving the slope-compensated emulated phase current signals of the plurality of phase and generating the average phase current signal indicative of the average current value of the slope-compensated emulated phase current signals of all of the phases; and
   a plurality of amplifier circuits, each amplifier circuit being associated with a respective phase and receiving the average phase current signal and the slope-compensated emulated phase current signal for a respective phase, each amplifier circuit generating the phase current balance control signal for the respective phase indicative of a difference between the slope-compensated emulated phase current signal of the respective phase and the average phase current signal.

9. The multi-phase current mode hysteretic modulator of claim 8, wherein the plurality of amplifier circuits comprise:
a plurality of operational transconductance amplifiers, each operational transconductance amplifier having an non-inverting input terminal coupled to receive the average phase current signal and an inverting input terminal coupled to receive the slope-compensated emulated phase current signal for a respective phase, each operational transconductance amplifier generating an output current signal indicative of the difference between the slope-compensated emulated phase current signal for the respective phase and the average phase current signal; and
a plurality of current-voltage converting circuits, each current-voltage converting circuit being coupled to receive the output current signal from a respective operational transconductance amplifier of a respective phase and to provide a voltage signal being the phase current balance control signal,
wherein the phase current balance control signal is added to or subtracted from the voltage control loop error signal to generate the combined signal for each phase.

10. The multi-phase current mode hysteretic modulator of claim 9, wherein each of the plurality of current-voltage converting circuits comprises a parallel resistor-capacitor circuit.

11. The multi-phase current mode hysteretic modulator of claim 1, wherein the modulator comprises one of a peak current buck modulator, a peak current boost modulator, a valley current buck modulator and a valley current boost modulator.

12. A method of balancing phase currents in a multi-phase voltage regulator, the method comprising:
generating a plurality of pulse width modulation (PWM) signals for driving a plurality of power stages in a plurality of phase;
generating a plurality of slope-compensated emulated phase current signals for the plurality of phases, each slope-compensated emulated phase current signal being indicative of an expected current level of the phase current being delivered by a respective power stage and incorporating a slope compensation signal;
generating a phase current balance control signal for each phase indicative of a difference between the slope-compensated emulated phase current signal of the respective phase and an average phase current signal; and
combining the phase current balance control signal for each phase with a voltage control loop error signal and comparing the combined signal to the slope-compensated emulated phase current signal for the respective phase to generate a duty cycle control signal of the respective phase, the duty cycle control signal controlling a duty cycle of the PWM signal of the respective phase, wherein the duty cycle control signals are generated for the plurality of phases to control the phase current delivered by each power stage.

13. The method of claim 12, wherein generating the plurality of PWM signals comprises:
generating the plurality of PWM signals for driving the plurality of power stages in the plurality of phase, each power stage receiving an input voltage and delivering a phase current through a respective inductor to an output node to which an output capacitor and a load are connected, wherein the plurality of PWM signals are generated in response to a feedback voltage signal indicative of a regulated output voltage at the output node.

14. The method of claim 13, further comprising:
generating, using an error amplifier, the voltage control loop signal indicative of the difference between the feedback voltage signal and the target voltage.

15. The method of claim 12, wherein generating the duty cycle control signals comprises:
providing a plurality of modulating comparators to generate the duty cycle control signals for the plurality of phases;
at each modulating comparator associated with a respective phase, coupling the combined signal of the voltage control loop error signal and the phase current balance control signal of the respective phase to a first input terminal and coupling the slope-compensated emulated phase current signal of the respective phase to a second input terminal; and
generating at an output terminal of each modulating comparator the duty cycle control signal being a reset signal for the respective phase.

16. The method of claim 12, wherein generating the plurality of slope-compensated emulated phase current signals for the plurality of phases comprises:
generating, using a plurality of ramp signal generator circuits, the slope-compensated emulated phase current signals in response to the PWM signal of the respective phases, each ramp signal generator circuit comprising a switched capacitor circuit implementing charge scaling to generate the slope-compensated emulated phase current signal for the respective phase.

17. The method of claim 16, wherein the multi-phase voltage regulator implements peak current buck current mode control and generating, using the plurality of ramp signal generator circuits, the slope-compensated emulated phase current signals comprises:
at each ramp signal generator for a respective phase, receiving the pulse-width modulation signal having an on-duration and an off-duration;
generating an up-ramp of the ramp signal having a slope proportional to the input voltage during the on-duration of the pulse-width modulation signal;
generating a down-ramp of the ramp signal having a slope proportional to the output voltage during the off-duration of the pulse-width modulation signal; and
providing the up-ramp and the down-ramp as the slope compensated emulated phase current signal for the respective phase.

18. The method of claim 12, wherein generating the phase current balance control signals for the plurality of phases comprises:
generating the average phase current signal by averaging the slope-compensated emulated phase current signals of all of the phases;
for each phase, generating a current signal indicative of a difference between the slope-compensated emulated phase current signal of the respective phase and the average phase current signal; and
for each phase, converting the current signal to a voltage signal as the phase current balance control signal of the respective phase.

19. The method of claim 17, wherein converting the current signal to a voltage signal as the phase current balance control signal of the respective phase comprises:

for each phase, converting the current signal to the voltage signal as the phase current balance control signal of the respective phase using a parallel resistor-capacitor circuit.

20. The method of claim 12, wherein the multi-phase voltage regulator implements one of peak current buck current mode control, peak current boost current mode control, valley current buck current mode control, and valley current boost current mode control.

* * * * *